June 29, 1965

H. H. AVERY ETAL

3,191,394

CONSERVATION ARRANGEMENT AND METHOD

Filed March 26, 1963

INVENTORS.
HAZELTON H. AVERY
ROLLAND G. STURM
BY Byron, Hume, Groen & Clement
Attorneys.

United States Patent Office 3,191,394
Patented June 29, 1965

1

3,191,394
CONSERVATION ARRANGEMENT AND METHOD
Hazelton H. Avery, Clarks Hill, Ind., and Rolland G. Sturm, Chicago Heights, Ill., assignors to Union Tank Car Company, Chicago, Ill., a corporation of New Jersey
Filed Mar. 26, 1963, Ser. No. 268,069
21 Claims. (Cl. 62—54)

This invention relates in general to the storage of volatile liquids. It deals more particularly with a conservation arrangement and method for minimizing losses of a stored volatile liquid from a storage tank. The method and arrangements disclosed herein constitute improvements on those disclosed in the Basore et al. Patent No. 2,944,045, assigned to the same assignee as the present invention.

It is an object of the present invention to provide an improved conservation arrangement and method for minimizing losses of a stored volatile liquid from a storage tank.

It is another object to provide an improved conservation arrangement and method for minimizing vapor losses from a volatile liquid, in a storage tank, to the atmosphere.

It is still another object to provide a conservation arrangement and method for controlling the pressure in the vaporous area above a stored volatile liquid in a storage tank to minimize vapor losses to the atmosphere.

It is yet another object to provide a conservation arrangement and method for cooling and coalescing vapor in a volatile liquid storage tank, as well as inhibiting further vaporization of the volatile liquid, to maintain the pressure within the storage tank below a predetermined maximum value.

The foregoing and other objects are realized in accordance with the present invention, by providing an improved conservation arrangement and method which reduces losses of a stored volatile liquid from a storage tank to a minimum. Briefly, the invention contemplates cooling and coalescing the vapor which has formed, and deploying the cooled vapor in a "blanket" over the stored liquid to inhibit further vaporization of the liquid, whereby the pressure within the storage tank is maintained below a predetermined maximum value. Accordingly, a conventional pressure-vacuum relief valve does not open to vent vapor to the atmosphere.

The present invention envisions introducing a spray of liquid coolant, having a relatively high heat transfer capacity, into passage means above the surface of a stored volatile liquid wherein the spray drops downwardly through the passage means toward the surface of the volatile liquid from an upper region of the vaporous area within the tank. The coolant spray absorbs heat from the vapor above the stored liquid to coalesce (and to some extent condense) vapor within the vaporous area above the stored liquid and tend to lower the pressure exerted by the vapor. The spray enters the stored liquid, is cooled as it passes through the liquid, is recovered from the stored liquid, and is resprayed into the passage means.

In certain forms of conservation arrangements embodying features of the present invention the spray of liquid coolant falls directly into the stored volatile liquid. In such case, the impact of the spray upon the surface of the stored volatile liquid tends to create a dynamic effect and drive coalesced vapor into the storage tank. Accordingly, the pressure within the vaporous area of the storage tank, is further reduced.

In other forms of the present invention the coolant is collected in a trap and passed independently through the stored liquid for heat transfer. In the latter case, the rich stored liquid condensate which collects on the surface of the trapped coolant provides a ready source of highly volatile liquid, the vaporization of which tends to prevent excessive pressure decreases in the tank at night, for example.

The descending spray of liquid coolant and cooled vapor creates a draft through the passage means and more warm vapor is continuously sucked through the passage means from the upper region of the vaporous area. Cooled vapor is continuously expelled from the passage means immediately above the surface of the stored liquid and passes outwardly over the surface, tending to form a cool blanket of vapor. As a result, an equilibrium distillation condition tends to be established between the surface of the liquid and the blanket of cool vapor, inhibiting further vaporization of the liquid and tending to forestall pressure increases in the storage tank.

In a first form of the conservation arrangement embodying features of the present invention, the spray of liquid coolant and the warm vapor from the uppermost region of the vaporous area within the storage tank pass in direct concurrent contact through the vertically disposed passage means. The vapor is cooled and subsequently expelled at a relatively lower temperature over the surface of the stored liquid. The liquid coolant spray falls directly on the surface of the stored liquid in one variation of the first form and creates the dynamic effect hereinbefore referred to, and is trapped and recirculated separately in another variation.

In a second form of the conservation arrangement embodying features of the present invention, some of the advantages of countercurrent coolant and vapor contact are incorporated. The liquid coolant and warm vapor from the upper region of the vaporous area within the storage tank pass in direct concurrent and indirect, substantially countercurrent contact, before cooled vapor is expelled over the surface of the stored liquid. The vapor is expelled at a relatively lower temperature than achieved with the aforedescribed first form of the present invention as a result of the indirect countercurrent contact. The coolant spray falls directly on the surface of the stored liquid and creates the dynamic effect hereinbefore referred to.

In a third form of the conservation arrangement embodying features of the present invention, the liquid coolant spray and warm vapor pass in direct contact both in concurrent and countercurrent flow, and the cooled vapor is expelled at yet a lower temperature. In contrast to the aforementioned first two forms of the present invention (with the exception of the variation of the first form) the liquid coolant spray does not fall directly into the stored volatile liquid or pass through it in intimate contact.

In a fourth form of the conservation arrangement embodying features of the present invention, similarly to the third form referred to immediately above, the vapor being cooled passes in direct concurrent and countercurrent contact with the liquid coolant spray. Furthermore, intimate contact between the liquid coolant and the stored volatile liquid is substantially avoided, since the liquid coolant spray does not fall directly into the stored liquid. In addition, any fine droplets of the liquid coolant spray which are carried past the countercurrent stage of cooling by the draft created are trapped and returned to the conservation arrangement.

The invention, both as to its organization and method of operation, taken with further objects and advantages thereof, will best be understood by reference to the following description taken in connection with the accompanying drawings, in which.

Figure 1:
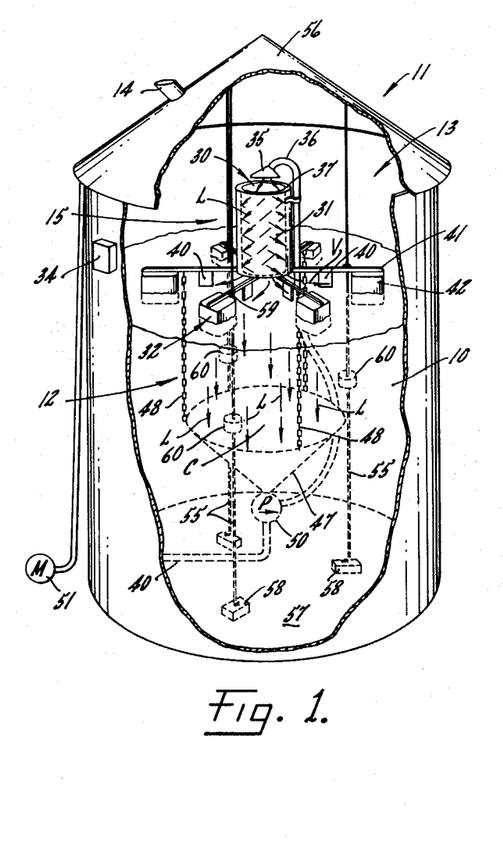
FIGURE 1 is a perspective view of a volatile liquid storage tank incorporating a first form of a conservation arrangement embodying features of the present invention, with parts broken away.

Referring now to the drawings, and particularly to FIGURE 1, a conventional storage tank for a volatile liquid 10 is illustrated generally at 11. For purposes of illustration, the volatile liquid 10 is gasoline, although the basic tenets of the present invention apply equally as well to virtually any volatile liquid; naphtha, hexane, etc. The tank 11 incorporates a conservation arrangement 12 embodying features of a first form of the present invention for cooling and coalescing the vapor which has formed in the tank 11, as well as for inhibiting further vaporization of the stored liquid 10, whereby the pressure within the vaporous area or chamber 13 of the tank 11 is maintained below a predetermined maximum value and above a predetermined minimum value.

If the pressure within the chamber 13 of the storage tank 11 exceeds the predetermined maximum value the conventional pressure-vacuum relief valve 14 is normally effective to vent the chamber 13 to the atmosphere in order to avoid exerting excessive stress on the tank 11. In such case, the certain amount of vapor and, accordingly, stored volatile liquid 10 is lost to the atmosphere. If the pressure decreases below the minimum value, air is admitted to the tank 11, of course.

During a day's (24 hours) operation of the storage tank 11, the heat of the tank daytime environment normally causes an expansion of the vapor within the chamber 13 as well as an increased rate of vaporization of the stored liquid 10. As a result of the expansion of the vapors and the increased rate of vaporization, of course, it is not uncommon for the pressure in the tank 11 to increase rapidly on a warm day, tending to exceed the aforementioned maximum pressure, whereby the tank 11 is vented to the atmosphere. Since the pressure is obviously created by the higher fractions of distillation or evaporization (which are most sensitive to temperature change), these fractions, if lost to the atmosphere, degrade the product stored. In contrast, at night the vapor present in the chamber 13 tends to cool, coalescing and decreasing the pressure within the chamber 13. Since the rate of vaporization decreases also, it is not uncommon for a slight vacuum to develop within the tank 11. Normally, however, a gradual release of vapor from the supersaturated surface of the liquid 10 and the gradual return of the liquid-vapor system to one where the vapor and the liquid 10 are in equilibrium at the existing temperature, causes the pressure to build up slightly to tend to overcome the naturally encountered vacuum. This may be attributed to the promotion of evaporation of the reduced pressure over the liquid 10. Accordingly, the pressure-vacuum relief valve 14 normally does not operate to admit air from the atmosphere to the tank 11, although it is capable of doing so to relieve stress on the tank 11. In addition, in certain subsequently described variations and alternate forms of conservation arrangements embodying features of the present invention, a novel arrangement for facilitating vaporization of the stored liquid at night to prevent excessive reductions is provided.

As the environmental temperature increases and decreases, it heats and cools the liquid 10 also, of course. However, only the peripheral areas of the liquid 10 undergo any substantial temperature change compared to the vapor because of the difference in densities. It then follows that the core C of the stored liquid 10 is relatively cooler than the vapor in the chamber 13 during the day and warmer than the vapor at night.

As the pressure within the chamber 13 rises during the heat of the day and approaches the aforementioned predetermined maximum pressure, the conservation arrangement 12 is automatically actuated and becomes effective to cool and coalesce the warm vapor as well as inhibit further vaporization of the stored liquid 10. Accordingly, the pressure in the chamber 13 is maintained below the predetermined maximum. In contrast, at night it is contemplated that the conservation arrangement become actuated to heat and expand relatively cooler vapors if the pressure tends to fall below a predetermined minimum. We are concerned most with daytime operation, however, and the various forms of the present invention are described primarily in terms of maintaining tank 11 pressures below the predetermined maximum pressure.

The conservation arrangement 121 includes a chimney unit 15 into which a liquid coolant L is sprayed, the spray falling downwardly toward the surface of the liquid 10. A draft is established through the chimney unit 15 and warm vapor from the uppermost region of the chamber 13 is drawn through the chimney unit 15 and cooled in the process of direct concurrent contact with the spray of liquid coolant L. As the vapor cools it tends to coalesce (and in part condense) reducing the pressure in the chamber 13.

The cool vapor is expelled over the surface of the stored liquid 10 to form a blanket of cool vapor and inhibit further vaporization of the stored liquid 10. In the conservation arrangement 12, the spray of liquid coolant L falls directly onto the stored liquid 10 through the chimney unit 15, creating a dynamic state on the surface of the liquid 10 and tending to drive a portion of the coalesced vapor into the stored liquid 10, further reducing pressure in the chamber 13.

Figure 4:
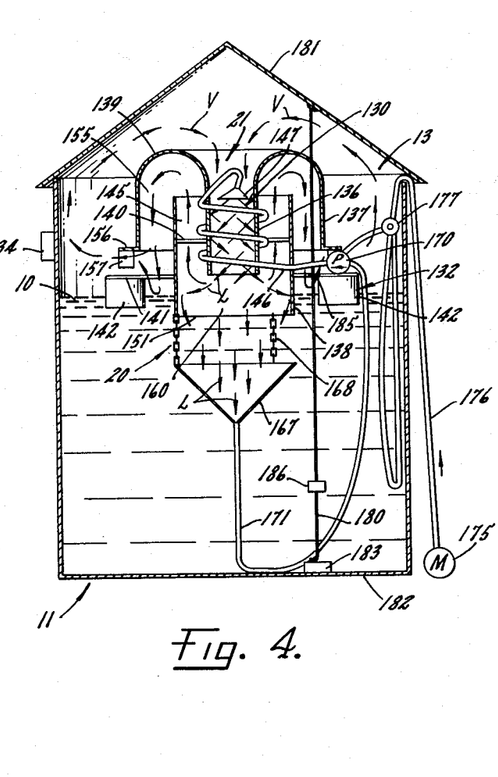
FIGURE 4 is a diagrammatic side elevational view, in partial section, of a volatile liquid storage tank incorporating a second form of the conservation arrangement embodying features of the present invention.

In contrast to the conservation arrangement 12 the conservation arrangement 20, embodying features of a second form of the present invention and illustrated in FIGURE 4, provides both concurrent and countercurrent flow of the warm vapor and the liquid L before cooled vapor is expelled outwardly over the surface of the stored liquid 10. The conservation arrangement 20 includes a chimney unit 21 through which liquid coolant L passes upwardly in what approximates countercurrent flow with the warm vapor, and is subsequently sprayed downwardly in direct concurrent contact with the warm vapor as it enters the chimney unit 21. The vapor is expelled from the chimney unit 21 at a relatively cooler temperature than might be expected with the conservation arrangement 12 because the departing vapor is in contact with the liquid coolant L before it is initially sprayed into the chimney unit 21 wherein it becomes warmer.

Figure 5:
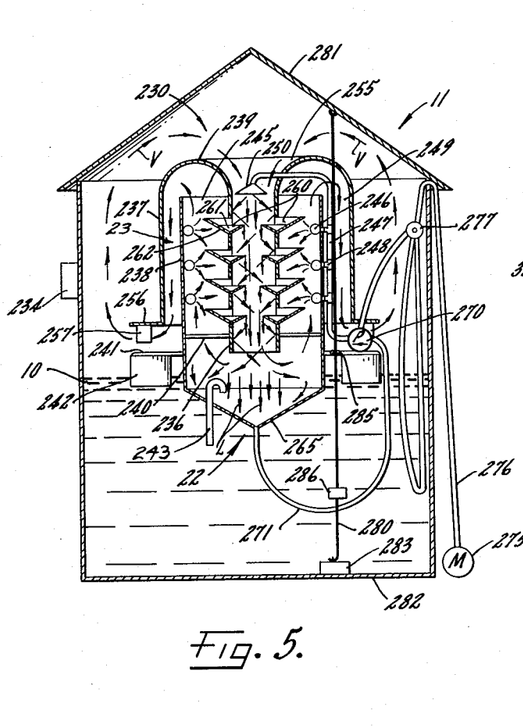
FIGURE 5 is a diagrammatic side elevational view, in partial section, of a volatile liquid storage tank incorporating a third form of the conservation arrangement embodying features of the present invention.

FIGURE 5 illustrates a conservation arrangement 22 embodying features of yet a third form of the present invention. The conservation arrangement 22 is broadly similar in concept to the conservation arrangement 20 hereinbefore discussed. It includes a chimney unit 23 through which a spray of liquid coolant L and warm vapor pass in direct contact, however, both concurrently and countercurrently. Furthermore, in contrast to the conservation arrangement 20, the liquid coolant L does not fall directly into the stored volatile liquid 10. Such an arrangement is frequently desirable where the stored liquid 10 is readily contaminated by a liquid coolant L utilized, or tends to absorb it, for example.

Figure 6:
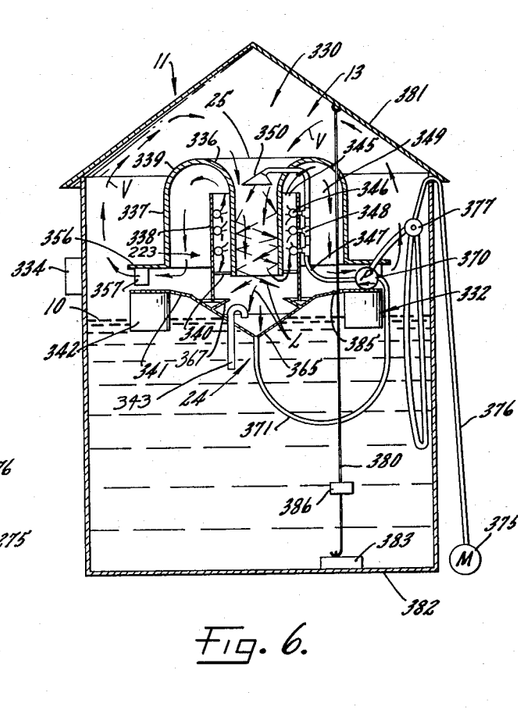
FIGURE 6 is a diagrammatic side elevational view, partial section, of a volatile liquid storage tank incorporating a fourth form of the conservation arrangement embodying features of the present invention.

FIGURE 6 illustrates a conservation arrangement 24 embodying features of still a fourth form of the present invention. The conservation arrangement 24 is generally similar in concept to the conservation arrangement 22 hereinbefore discussed. It includes a chimney unit 25 through which a spray of liquid coolant L and warm vapor pass in direct contact, both concurrently and countercurrently. In addition, the spray of liquid coolant L does not fall directly into the stored volatile liquid 10. An added feature is that the conservation arrangement 24 is effective to salvage minute droplets of the liquid coolant L which tend to be carried through the concurrent and countercurrent stages by the vapor being cooled, and return the droplets to the control of the conservation arrangement 24.

Figure 2:
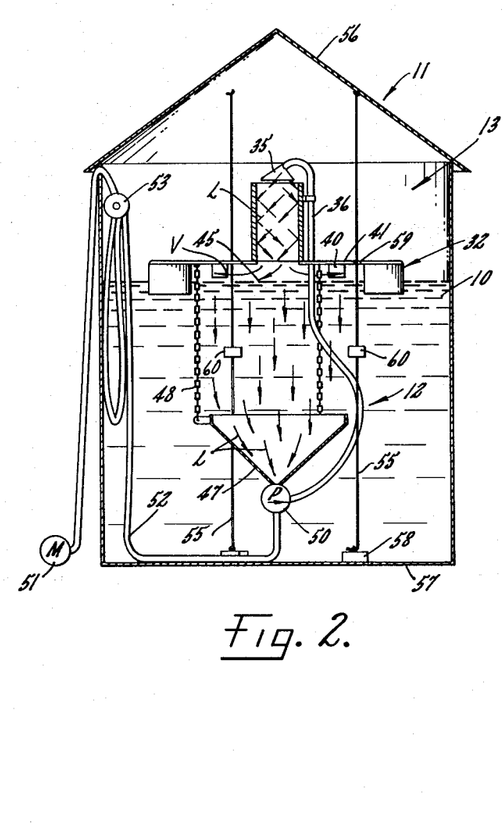
FIGURE 2 is a diagrammatic side elevational view, in partial section, of the volatile liquid storage tank and conservation arrangement illustrated in FIGURE 1.

Referring now to FIGURES 1 and 2, and specifically to the conservation arrangement 12 embodying features of the first form of the present invention, the conservation arrangement 12 is seen to include a liquid coolant spray system 30 for introducing a spray of liquid coolant L into the generally cylindrical chimney unit 15 which is supported on a float assembly 32 floating on the surface of the stored volatile liquid 10. The spray system 30 is actuated when the pressure within the chamber 13 increases to a pre-selected pressure slightly below the aforementioned maximum (or venting) pressure and trips a conventional pressure switch 34.

The spray system 30 is also actuated when the pressure falls below a predetermined minimum (or inlet) pressure and trips the switch 34. However, since various features of certain forms of the present invention serve to prevent such a pressure decrease, the conservation arrangement 12 does not normally operate at night and a further discussion of vapor "warming" at night is not considered necessary.

The spray of liquid coolant L passes downwardly through the chimney unit 15 and is effective to cool and coalesce warm vapor within the chamber 13 (during the day) and consequently reduce the pressure in the chamber. In this light, as has been pointed out, some condensation of the vapor also takes place. Collaterally, the spray of liquid coolant L passing downwardly through the chimney unit 15 establishes the downward draft which draws more warm vapor after it, cooling the vapor, and expelling the cooled vapor over the surface of the liquid 10 to establish a blanket of cool vapor. The presence of this cool blanket of vapor on the surface of the liquid 10 tends to establish an equilibrium distillation condition between the surface of the stored liquid 10 and the cool blanket of vapor, and inhibit additional vaporization. The liquid coolant L which has been found to be most desirable and is preferably utilized is liquid mercury.

The advantages of using a liquid mercury spray as a heat transfer media are numerous. For example, mercury is substantially inert and does not become easily contaminated. It falls readily through a relatively viscous stored liquid. Also, mercury is easily broken up into small droplets and has a relatively good heat capacity, affording a large surface area in dynamic suspension conducive to rapid heat transfer. Furthermore, it is heavy enough, even in droplet size, not to be effected by thermal currents, or by a filling or emptying current created in the stored liquid 10. In addition, a small pump can handle large quantities of it.

The liquid coolant spray system 30 which sprays the liquid coolant L includes a nozzle 35 of any well known type for spraying the coolant in droplet form into the cylindrical chimney unit 15 in the manner illustrated in FIGURES 1 and 2. The nozzle 35 receives the liquid coolant L under pressure from the supply pipe 36 appropriately secured to the chimney unit 15, and sprays fine droplets of the coolant L outwardly and downwardly against the inside of the cylinder 37 comprising the chimney unit 15, in cooling contact with the warm vapor within the cylinder 37.

The warm vapor within the cylinder 37 is cooled primarily by direct contact with the droplets of liquid coolant L and indirectly to a certain extent by contact with the cylinder 37 which is, in turn, cooled directly by the spray of liquid coolant L. The cylinder 37 is fabricated of a relatively thin sheet metal having good heat transfer characteristics. Consequently, it absorbs heat from the vapor surrounding it, and dissipates this heat through the spray of liquid coolant L which also contacts it. It should be understood, however, that cylinder 37 might be fabricated of non-metallic materials, since primary heat transfer is by direct contact.

As the warm vapor within the cylinder 37 coalesces, the pressure within the chamber 13 decreases. The cool vapor descends within the cylinder 37 and a draft is created, sucking more warm vapor down through the cylinder 37 from the upper region of the chamber 13.

The cool vapor is expelled from the lower end of the cylinder 37 and directed radially of the conservation arrangement 12 by the vanes 40 supported in depending relationship from the radial arm members 41 of the float assembly 32 which carries the chimney unit 15. The radial arm members 41 are secured to buoyant blocks 42 of plastic, for example, or any other suitable buoyant material. As will be noted, the blocks 42 of the float assembly 32 support the chimney unit 15 in displaced relationship with the surface of the stored volatile liquid 10, permitting the cool vapor to be expelled under the cylinder 37. The spray of liquid coolant L continually falls upon the surface of the stored volatile liquid 10 creating a somewhat dynamic surface state immediately below the cylinder 37, as in the area 45. In the area 45 where this dynamic state exists, there is a tendency for a portion of the coalesced vapor to be driven into the stored liquid 10, further decreasing the pressure within the chamber 13.

The spray of liquid coolant L enters the stored liquid 10 and descends through the aforedescribed relatively cooler core C of the stored liquid, dissipating the heat it has acquired from warm vapor in the chamber 13. After passing for a predetermined distance through the cooler core C of the stored liquid 10, the droplets of liquid coolant L fall into a conical collector 47. The conical collector 47 is suspended from the radial arms 41 by chain connectors 48 or the like, appropriately secured to corresponding arms 41 and to the collector 47.

The conical collector 47 acts as a reservoir of cool liquid coolant L for the pump 50, which is preferably a conventional hydraulically-driven pump. The pump 50 pumps the liquid coolant L upwardly through the supply pipe 36 to the nozzle 35 where it is once more sprayed outwardly and downwardly into the cylinder 37. The hydraulically-driven pump 50 is driven in a well known manner by a conventional electric motor-hydraulic pump 51 through a hydraulic conduit complex 52 which is appropriately supported in a reel 53 of any well known construction to accommodate vertical displacement of the conservation arrangement 12 as the level of the stored liquid 10 within the tank 11 varies.

The motor 51, and consequently the conservation arrangement 12, are actuated by the aforedescribed pressure switch 34 when the pressure within the chamber 13 reaches the aforementioned pre-selected pressure slightly less than the normal venting pressure of the chamber 13. Conversely, when the pressure within the chamber 13 drops below the pre-selected pressure, the switch 34 shuts the motor 51 off.

To accommodate vertical travel of the conservation arrangement 12 within the tank 11 as the level of the stored liquid 10 varies, and to prevent the conservation arrangement 12 from drifting indiscriminately around the confines of the tank 11 three guide wires 55 are provided secured to the roof 56 of the tank 11 and anchored at the base 57 of the tank with anchors 58 for example. The guide wires 55 extend through appropriately positioned guide eyes 59 secured to corresponding arms 41 of the float assembly 32.

To prevent the conservation arrangement 12 from moving downwardly and engaging the base 57 of the tank 11 wherein the liquid coolant L from the conical collector 47 would be spilled, a stop 60 is preferably secured to each of the guide wires 55. If too much of the stored liquid 10 is drawn off the tank 11, the float arms 41 or buoyant blocks 42 seat on stops 60.

Figure 3:
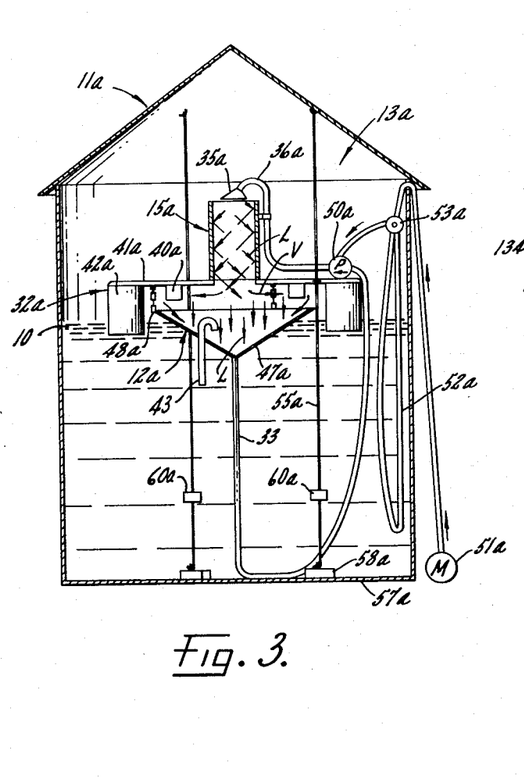
FIGURE 3 is a diagrammatic side elevational view, in partial section, of a volatile liquid storage tank incorporating a variation of the first form of conservation arrangement illustrated in FIGURES 1 and 2.

Turning now to FIGURE 3, a conservation arrangement comprising a variation on the immediately aforedescribed first form of conservation arrangement 12 is shown generally at 12a. The conservation arrangement 12a is distinguished in that the spray of liquid coolant L does not fall through the liquid 10 but is collected without coming into direct contact therewith by the conical collector 47a and drawn by the pump 50a through a lengthy storage pipe 33 which passes through the core C of the stored liquid 10.

It has been found that the coolant liquid L is adequately cooled if it passes through the cool core C of stored liquid 10 within the confines of the storage pipe 33. With this arrangement a smaller capacity pump 50a is utilized since it is not required to raise the liquid coolant L any great distance through the supply pipe 36a to reach the nozzle 35a. Furthermore, in the conservation arrangement 12a, the pump 50a does not require a protective covering ordinarily necessary for operation immersed in the stored liquid 10.

The conservation arrangement 12a incorporates another feature of the present invention, which feature is substantially effective to forestall pressure reduction in the tank 11 at night to a point where air is admitted to he tank. This feature resides in the conical collector 47a arrangement whereby liquid coolant L is collected apart from the stored liquid 10. As a result, a rich layer of stored liquid condensate tends to collect on the surface of coolant L trapped in the collector 47a. This rich layer of condensate tends to evaporate readily if the pressure within the tank 11 decreases sufficiently. This vaporization counteracts the pressure decrease and, accordingly, pressure in the tank 11 virtually never falls to that point at which air is admitted to the tank 11. To prevent an excess accumuation of condensate on the surface of the coolant L within the collector 47a, a siphon pipe 43 is provided extending from within the collector to a point in the core C of the stored liquid 10. Excess condensate is thus siphoned directly into the core C of liquid 10.

In all other respects, the conservation arrangement 12a is substantially identical to the conservation arrangement 12 immediately before discussed in detail. Accordingly, corresponding components of the two arrangements 12 and 12a are identified by corresponding reference numerals, the corresponding reference numerals associated with the conservation arrangement 12a being distinguished by the addition of the suffix "a."

Referring now to FIGURE 4, and specifically to the conservation arrangement 20 embodying features of a second form of the present invention, the arrangement 20 is seen to include a spray system 130 for introducing a spray of liquid coolant L into the chimney unit 21 which is supported on a float assembly 132 floating on the surface of the stored volatile liquid 10. The spray system 130 is actuated when the pressure within the chamber 13 increases to the aforementioned pre-selected pressure slightly less than the maximum (venting) pressure and trips a conventional pressure switch 134.

The chimney unit 21 and the spray system 130 are constructed and arranged so that an additional stage of direct concurrent contact is established between a spray of liquid coolant L and the warm vapor entering the chimney unit 21. This is followed by a second stage of indirect countercurrent contact between the vapor and the liquid coolant L. The cool vapor then expelled over the surface of the liquid 10 is at a lower temperature than might be expected with the conservation arrangement 12 hereinbefore discussed as a result of this second stage indirect countercurrent contact between the liquid coolant L and the vapor.

As seen in FIGURE 4, the chimney unit 21 includes a unitary inner cylinder 136 and an outer cylinder 137 nested over an intermediate cylinder 138 and connected by an arcuate base 139 to define a down-up-down maze through which the warm vapor from the chamber 13 passes in being cooled before it is expelled over the surface of the stored liquid 10. The unitary inner cylinder 136 and outer cylinder 137 once more might be fabricated of sheet metal having relatively good heat transfer characteristics and are rigidly interconnected with the intermediate cylinder 138 through a plurality of radial strut members 140. The intermediate cylinder 138, is, in turn, supported on the radial arm member 141 of the float assembly 132.

The radial arm members 141 are secured to buoyant blocks 142 of plastic, for example. The buoyant blocks 142 of the float assembly 132 support the inner cylinder 136 in displaced relationship with the surface of the stored liquid 10, permitting cooled vapor to be expelled from the inner chamber 136 into the vertical passage 145 defined between the intermediate cylinder 138 and the inner cylinder 136.

Encircling the inner cylinder 136 in the passage 145 is a liquid coolant supply pipe 146 which spirals around the inner cylinder 136 and terminates in a spray nozzle 147 above the inner cylinder 136. The spray nozzle 147 receives liquid coolant L under pressure from the supply pipe 146 and sprays fine droplets of coolant L outwardly and downwardly against the inside of the inner cylinder 136, in cooling contact with the warm vapor present in the inner cylinder 136.

The warm vapor within the cylinder 136 is cooled by direct contact with the droplets of liquid coolant L and indirectly by contact with the cylinder 136 itself. The cylinder 136 is, in turn, cooled directly by the spray of liquid coolant L since, in this instance, it has relatively good heat transfer characteristics, as has been pointed out. The inner cylinder 136 absorbs heat from the vapor which contacts it and dissipates this heat through the spray of liquid coolant L which also contacts it. The greatest portion of heat transfer is effected directly between coolant L and vapor V, however, as has been pointed out.

As the warm vapor within the inner cylinder 136 coalesces the pressure within the chamber 13 decreases. The cooled vapor descends in the inner cylinder 136 and a draft is created, drawing more warm vapor into the chimney unit 21 from the upper region of the chamber 13.

The relatively cool vapor is expelled from the lower end of the inner cylinder 136 and turned upwardly through the passage 145 defined between the inner cylinder 136 and the intermediate cylinder 138. The lowermost edge 151 of the intermediate cylinder 138 extends into the stored liquid 10 to prevent vapor from escaping underneath it. The relatively cool vapor passes over and around the spiral supply pipe 146 as it is drawn through the passage 145 by the draft created. Since the liquid coolant L within the supply pipe 136 has not yet been noticeably warmed by the contact with warm vapor, the vapor passing through the passage 145 is in indirect contact with liquid coolant at substantially the temperature at which it is introduced into the chimney unit 21. This relative vapor and liquid coolant L flow embodies certain features of indirect countercurrent contact.

The further cooled vapor which departs the passage 145 is turned downwardly toward the surface of the stored liquid 10 through the passage 155 defined between the outer cylinder 137 and the intermediate cylinder 138. An outwardly extending flange 156 defining the lower periphery of the outer cylinder 137 is separated from the surface of the stored liquid 10 and the cooled vapors are expelled outwardly under the flange 156 and over the surface of the stored liquid 10. The flange 156 preferably carries a plurality of radially disposed vanes 157 depending therefrom for directing the course of the cooled vapor outwardly over the surface of the stored liquid 10. The outwardly directed cooled vapor tends to establish a blanket over the surface of the stored liquid 10. Accordingly, further vaporization of the stored liquid 10 is inhibited, as has hereinbefore been thoroughly discussed.

As the vapor within the chamber 13 is cooled and coalesced, and further vaporization of the stored liquid 10 is inhibited in the foregoing manner, the spray of liquid coolant L is continually falling upon the surface of the stored liquid 10 within the confines of the inner cylinder 136. As the spray strikes the surface of the stored liquid 10, a dynamic surface state is established immediately beneath the chimney unit 21, as seen in the area 160. In the area 160 where this dynamic state exists, there is a tendency for a portion of the coalesced vapor to be driven into the stored liquid, further decreasing the pressure within the chamber 13.

The spray of liquid coolant L enters the stored liquid 10 and immediately falls into a conical collector 167. The conical collector 167 is suspended from the lower periphery 151 of the intermediate cylinder 138 by chain connectors 168 or the like, appropriately secured to the intermediate cylinder 138 and to the collector 167.

The collector 167 is connected with a conventional hydraulically driven pump 170 supported on one of the buoyant blocks 142 through an extended liquid coolant storage pipe 171 which depends from the collector 167 and passes through the aforedescribed cooler core C of the stored liquid 10. In passing through the cooler core C of the stored liquid 10, the heat absorbed by the liquid coolant L of the vapor within the chamber 13 is substantially dissipated to the stored liquid. Consequently, upon reaching the pump 170, it is sufficiently cooled to be sprayed into the chimney unit once more.

The pump 170 pumps the liquid coolant L upwardly from the storage pipe 171 through the supply pipe 146 to the spray nozzle 147, where it is once more sprayed outwardly and downwardly into the inner cylinder 136. The pump 170 is driven in a well known manner by a conventional electric motor-hydraulic pump 175 through a hydraulic conduit complex 176 which is appropriately supported in a reel 177 (of well known construction) to accommodate vertical displacement of the conservation arrangement 20 as the level of the stored liquid 10 within the tank 11 varies.

The motor-pump 175 and consequently the conservation arrangement 20, are actuated when the pressure switch 134 is tripped by an increase in pressure within the chamber 13 to the aforementioned pre-selected pressure slightly less than the exhaust (venting) pressure. Similar to the pump 50a hereinbefore discussed in relation to the conservation arrangement 12a, the pump 170 is only required to raise the liquid coolant L a short distance to the nozzle 147, and consequently requires only a relatively low horsepower motor-pump 175 arrangement for power.

To accommodate vertical travel of the conservation arrangement 20 within the tank 11 as the level of the stored liquid 10 varies, and to prevent the conservation arrangement 20 from drifting indiscriminately around the confines of the tank 11 three guide wires 180 (only one of which is shown) are secured to the roof 181 of the tank 11 and anchored at the base 182 of the tank 11 with anchors 183 (only one of which is shown). The guide wires 180 extend through appropriately positioned guide eyes 185 (only one of which is shown) secured to the corresponding radial arms 141 of the float assembly 132.

To prevent the conservation arrangement 20 from moving downwardly and engaging the base 182 of the tank 11, wherein liquid coolant L from the conical collector 167 would be spiller, stops 186 (only one of which is shown) are preferably secured to the guide wires 180. If too much of the stored liquid 10 is drawn off the tank 11, the float arms 141 or buoyant blocks 142 seat on the stop 186.

The conservation arrangement 20 has been discussed solely in terms of daytime operation. It should be understood, however, that should the pressure within the tank 11 fall below the aforementioned predetermined minimum pressure, actuation of the coolant L spray is effective to warm vapor within the tank and raise the pressure therein.

Referring now to FIGURE 5, and specifically to the conservation arrangement 22 embodying features of still a third form of the present invention, the arrangement 22 is seen to include a spray system 230 for introducing a spray of liquid coolant L into the chimney unit 23 which is supported on a float assembly 232 floating on the surface of the stored volatile liquid 10. The spray system 230 is actuated when the pressure within the chamber 13 increases (during the daytime operation) to the aforementioned pre-selected maximum pressure and trips a conventional pressure switch 234. Similarly to the conservation arrangement 20, the chimney unit 23 and the spray system 230 of the conservation arrangement 21 are constructed and arranged so that both concurrent and countercurrent contact between the liquid coolant L and the warm vapor is established. In the case of the conservation arrangement 22, however, the concurrent and countercurrent contact comprises direct contact between a spray of liquid coolant L and the warm vapor. As a result, the warm vapor is cooled and expelled over the surface of the stored liquid 10 at a slightly lower temperature than might be expected with the conservation arrangement 20.

As seen in FIGURE 5, the chimney unit 23 includes a unitary inner cylinder 236 and outer cylinder 237 nested over an intermediate cylinder 238 and connected by an arcuate base 239 to define a down-up-down maze similar to the conservation arrangement 20 through which the vapor passes in being cooled. The unitary inner cylinder 236 and outer cylinder 237 once more might be fabricated from sheet metal having relatively good heat transfer characteristics, and are interconnected with the intermediate cylinder 238 to a plurality of radial strut members 240. The intermediate cylinder 238 is, in turn, supported from the radial arm members 241 of the float assembly 232 which carries the chimney unit 223. The radial arm members 241 are secured to buoyant blocks 242 of plastic or the like.

Encircling the inner cylinder 236 in the passage 245 defined between the inner cylinder 236 and the intermediate cylinder 238, in spaced relationship, are three liquid coolant spray rings 246 of broadly conventional construction. These spray rings 246, are in turn, operatively connected with a liquid coolant supply pipe 247 by branch pipes 248 which are arranged as illustrated in the passage 249 defined between the outer cylinder 237 and the intermediate cylinder 238. The supply pipe 247 terminates in a nozzle 250 above the inner cylinder 236 and liquid coolant L is sprayed from the nozzle 250 as well as the spray rings 246 when the conservation arrangement 22 is actuated.

The nozzle 250 receives liquid coolant L under pressure from the supply pipe 247 and sprays fine droplets of the coolant outwardly and downwardly against the inside of the inner cylinder 236, in cooling contact with the warm vapor within the inner cylinder 236. The warm vapor within the inner cylinder 236 is cooled by direct contact with the spray of liquid coolant L and indirectly by contact with the cylinder 236 itself. As has been pointed out, the inner cylinder 236 is preferably formed of a relatively thin sheet metal having relatively good heat transfer characteristics, and, consequently, it readily absorbs heat from the vapor surrounding it and dissipates this heat through the spray of liquid coolant L which also contacts it.

As the warm vapor within the inner cylinder 236 coalesces, the pressure within the chamber 13 decreases. The cool vapor within the inner cylinder 236 descends and a draft is created, drawing more warm vapor downwardly into the inner cylinder 236 from the upper region of the chamber 13. Relatively cooler vapor is expelled from the lower end of the inner cylinder 236 and directly outwardly and upwardly into the passage 245 between the central cylinder 236 and intermediate cylinder 238.

As the relatively cooler vapor passes upwardly through the passage 245, it is intimately contacted by an inwardly directed spray of liquid coolant L from the spray rings 246. Accordingly, more coalescence and condensation of the vapor takes place, further reducing pressure in the chamber 13 within the tank 11. Since the spray descends through the passage 245 while the vapor ascends, the vapor departing the passage 245 is in intimate contact with the relatively coolest portion of the spray of liquid coolant L to enter the chimney unit 23.

After passing through the aforedescribed concurrent and countercurrent cooling stages, the cooled vapor is expelled from the passage 249 under the flange 256 defining the lower periphery of the outer cylinder 237. To direct the cooled vapor radially of the conservation arrangement 22 and create a blanket of cool vapor over the surface of the stored liquid 10, a plurality of radially disposed vanes 257 are suspended from the flange 256 in the manner illustrated in FIGURE 5. Blanket of cooled vapor tends to inhibit further vaporization of the stored volatile liquid 10 in the manner hereinbefore discussed.

As will be noted, the conservation arrangement 22 differs from the conservation arrangement 20 hereinbefore discussed in several other interesting aspects. For example, a large portion of the spray directed into the passage 245 from the spray rings 246 is collected in liquid coolant traps 260 formed in and extending through the inner cylinder 236. The traps 260 comprise opposed half-cones 261 and 262. The inner half-cone 261 is shallower than the outer half-cone 262 assuring that all the liquid coolant L which is collected in the traps 260 drops off the shallower half-cones 261 within the inner cylinder 236 after it has been utilized in the passage 245. Double utilization of the liquid coolant L is accordingly effected.

Furthermore, in another distinguishing feature of the conservation arrangement 22, it will be seen that the intermediate cylinder 238 has a closed conical bottom 265 into which the spray of liquid L descends. Consequently, the spray of liquid coolant L does not fall upon the surface of the stored volatile liquid 10. Such an arrangement is sometimes desirable to avoid contamination, for example, of the stored liquid 10 of the liquid coolant L where the liquids are of such a nature that such contamination might occur. A broadly similar arrangement is utilized in the conservation arrangement 12a hereinbefore discussed.

It should be noted here in passing that stored liquid 10 condensate collects on the surface of the liquid coolant L within the collector bottom 265 as the conservation arrangement operates. To prevent excess build-up of this condensate, a siphon tube 243 is provided to siphon liquid down into the core C of the stored liquid. It is preferable that all this condensate not be drawn off, however, since it is desirable to have some available for re-evaporation at night to prevent a reduction in pressure sufficient to admit air to the tank 11.

The conical bottom 265 of the intermediate cylinder 238 acts as a reservoir for the liquid coolant L. The reservoir bottom 265 is connected to a conventional hydraulically-driven pump 270 through a storage pipe 271 which extends downwardly through the cooler core C of the stored liquid 10. In passing through the core C of the stored liquid 10, a substantial portion of the heat which the liquid coolant L has acquired from the warm vapor in the chamber 13 is dissipated.

The pump 270 pumps the liquid coolant L upwardly through the supply pipe 247 to the spray rings 246 and the nozzle 250 where it is once more sprayed outwardly and downwardly into the inner cylinder 236 and the passage 245. The pump 270 is driven in a well known manner by a conventional electric motor-hydraulic motor-pump 275 through a hydraulic conduit complex 276 which is appropriately supported in a reel 277 of any well known construction. To facilitate vertical travel of the conservation arrangement 22 within the tank 11 as the level of the stored liquid 10 varies and to prevent the conservation arrangement 12 from drifting within the tank, three guide wires 280 (only one of which is shown) are provided secured to the roof 281 of the tank 11 and anchored at the base 282 of the tank 11 with anchors 283 (only one of which is shown). The guide wires 280 extend through appropriately positioned guide eyes 285 (only one of which is shown) secured to corresponding radial arm members 241 of the float assembly 232.

To prevent the conservation arrangement 22 from moving downwardly and damaging the supply pipe 271, for example, or tipping on its side, stops 286 (only one shown) are preferably secured to the guide wires 280. If too much of the stored liquid 10 is drawn off the tank 11, corresponding radial arm members 241 or buoyant blocks 242 of the float assembly 232 seat on the stops 286.

Referring to FIGURE 6 and specifically to the conservation arrangement 24 embodying features of still a fourth form of the present invention, the arrangement 24 is seen to include a spray system 330 for introducing a spray of liquid coolant L into the chimney unit 25 which is supported on a float assembly 332 floating on the surface of the stored volatile liquid 10. The spray system 330 is actuated (during daytime operation) when the pressure within the chamber 13 increases to the aforementioned pre-selected maximum pressure and trips a conventional pressure switch 334.

The chimney unit 25 and the spray system 330 are constructed and arranged so that both concurrent and countercurrent direct contact between a spray of liquid coolant L and the vapor being cooled is established. In this relationship, the conservation arrangement 24 is similar to the conservation arrangement 22 immediately hereinbefore discussed, the vapor being expelled over the surface of the liquid 10 at a generally like temperature.

Similarly to the conservation arrangement 22, the conservation arrangement 24 includes a unitary inner cylinder 336 and outer cylinder 337 nested over an intermediate cylinder 338 and connected by an arcuate base 339 to define a down-up-down maze through which the vapor passes in being cooled. The unitary inner cylinder 336 and outer cylinder 337 once more might be fabricated from thin sheet metal having relatively good heat transfer characteristics and are interconnected with the intermediate cylinder 338 through a plurality of radial strut members 340. The intermediate cylinder is, in turn, supported by the radial arm members 341 of the float assembly 332 which carries the chimney unit 25. The radial arm members 341 are secured to buoyant blocks 342 of plastic or the like floating on the surface of the stored volatile liquid 10.

Encircling the inner cylinder 336 in a passage 345 defined between the inner cylinder 336 and the intermediate cylinder 338 are three spray rings 346 which are connected with a supply pipe 347 by branch pipes 348. The supply pipe 347 and the branch pipes 348 are disposed in a passage 349 defined between the outer cylinder 347 and the intermediate cylinder 338. As will be noted, the supply pipe 347 terminates in a nozzle 350 at the top of the inner cylinder 336.

The nozzle 350 receives liquid coolant L under pressure from the supply pipe 347 and sprays fine droplets outwardly and downwardly against the inside of the inner cylinder 336 in cooling contact with the warm vapor within the cylinder 336. The warm vapor within the inner cylinder 336 is cooled by direct contact with the spray of liquid coolant L and indirectly by contact with the cylinder 336 which is, in turn, cooled directly by the spray of liquid coolant L. The cylinder 336 has good heat transfer characteristics, as has been pointed out, being fabricated of relatively thin sheet metal. Accordingly, it absorbs heat from the vapor surrounding it and dissipates this heat through the spray of liquid coolant L which also contacts it. As previously pointed out, however, the bulk of heat transfer is by direct contact between vapor V and coolant L.

As the warm vapor within the inner cylinder 336 coalesces, the pressure within the chamber 13 decreases. The relatively cooler vapor within the inner cylinder 336 descends and a draft is created, sucking more warm vapor into the inner cylinder 336 from the upper region of the chamber 13.

Relatively cooler vapor is expelled from the lower end of the cylinder 336 and turned upwardly through the passage 345 defined between the inner cylinder 336 and the intermediate cylinder 338. As the relatively cooler vapor ascends through the passage 345, a spray of liquid coolant L from the spray rings 346 descends through the passage 345 in countercurrent contact with the ascending vapor. Accordingly, the discharge temperature of the vapor as it is expelled from the upper end of the passage 345 is substantially a function of the liquid coolant L when it is introduced to the chimney unit 25.

As a relatively cool vapor departs the passage 345 it is turned downwardly through the passage 349 defined between the outer cylinder 347 and intermediate cylinder 338. The draft through the chimney unit 25 expels the cooled vapor from beneath the flanges 356 which define a lower periphery of the outer cylinder 336 and over the surface of the stored volatile liquid 10. To assure that the cooled vapor is directed outwardly over the surface of the stored liquid 10, a plurality of radially disposed vanes 357 are suspended from the flanges 356.

As the spray of liquid coolant L descends from the spray rings 346 and the nozzle 350, it does not fall directly into the bulk of the stored volatile liquid 10. The falling spray is collected by the relatively conical bottom 365 on the intermediate cylinder 338. Such an arrangement is sometimes advantageous where it is considered undesirable to commingle the liquid coolant L and the stored volatile liquid 10, for the reasons hereinbefore pointed out. Similarly to the conservation arrangements 12a and 22 hereinbefore discussed, and for identical reasons, a siphon tube 343 extends from within the collector bottom 365 into the core C of the stored liquid 10.

An additional feature of the conservation arrangement 25 is embodied in a series of liquid coolant traps 367 disposed around the periphery of the bottom 365 in the intermediate cylinder 338. The liquid traps 367 collect minute droplets of the liquid coolant L which are carried over into the passage 349 by the draft of cooled vapors being expelled and return them to the conical bottom 365.

The conical bottom 365 serves as a reservoir for the liquid coolant L which has been sprayed from the spray rings 346 and the nozzle 350. The conical reservoir of the bottom 365 is connected to a conventional hydraulically driven pump 370 by a storage pipe 371 which descends through the cooler core C of the stored liquid 10. As the liquid coolant L passes from the reservoir bottom 365 through the storage pipe 371 to the pump 370, a substantial portion of the heat it is acquiring from the warm vapor is dissipated. The pump 370 delivers the relatively cooled liquid coolant L to the spray rings 346 and the nozzle 350 through the supply pipe 347 in a manner which should now be well understood.

The hydraulically driven pump 370 is preferably driven in the manner hereinbefore discussed by an electric motorpump 375 of well known construction, through a hydraulic conduit complex 376. The hydraulic conduit complex 376 is supported in a reel 377 of well known construction to accommodate vertical displacement of the conservation arrangement 24 as the level of the stored liquid 10 within the tank 11 varies.

To facilitate vertical travel of the conservation arrangement 24 within the tank 11 as the level of the stored liquid varies, and prevent the conservation arrangement 24 from drifting around the confines of the tank 11, three guide wires 380 (only one of which is shown) are secured to the roof 381 of the tank 11 and anchored at the base 382 of the tank 11 with anchors 383 (only one of which is shown). The guide wires 380 extend through appropriately positioned guide eyes 385 (only one of which is shown), secured to corresponding radial arm members 341 of the float assembly 332.

To prevent the conservation arrangement 24 from moving downwardly and engaging the base 382 of the tank 11 whereby the conservation arrangement 24 might be damaged, stops 386 (only one shown) are preferably secured to each of the guide wires 380. If too much of the stored liquid is drawn off the tank 11, corresponding radial arm members 341 or buoyant blocks 342 seat on the stops 386.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. In a volatile liquid storage tank including a liquid containing portion and a chamber portion wherein vapors collect, a conservation arrangement comprising; vertically disposed passage means in the chamber portion, said passage means being open to the chamber portion at an upper end and at a lower end of said passage means, a source of liquid mercury, and means for spraying said liquid mercury downwardly through said passage means to cool warm vapors in said passage means, wherein a draft is created through said passage means from said upper end to said lower end, said warm vapors being cooled and coalesced while being drawn through said passage means to reduce the pressure in said chamber portion.

2. In a volatile liquid storage tank including a liquid containing portion and a chamber portion wherein vapors collect, a conservation arrangement comprising: vertically disposed passage means in the chamber portion, said passage means being open to the chamber portion at an upper end and at a lower end of said passage means, a source of liquid coolant, means for spraying said liquid coolant downwardly through said passage means to cool warm vapors in said passage means, wherein a draft is created through said passage means from said upper end to said lower end, said warm vapors being cooled and coalesced while being drawn through said passage means to reduce the pressure in said chamber portion, collector means for collecting said liquid coolant when it has passed through said passage means, and means connected to said collector means for recirculating said liquid coolant to said spray means for respraying downwardly through said passage means, said liquid coolant being passed through the stored volatile liquid before being returned to said spray means whereby heat acquired by the liquid coolant from the warm vapors is dissipated to the stored liquid.

3. The conservation arrangement of claim 2 further characterized in that said collector means is suspended below the surface of the stored liquid and said liquid coolant spray falls directly onto the surface of the stored liquid and passes in direct contact through the stored liquid to said collector means, said liquid coolant spray creating a dynamic state at the surface of the stored liquid as it falls directly into the stored liquid whereby coalesced and partially condensed vapors are driven into the stored liquid to further reduce the pressure in the chamber portion.

4. The conservation arrangement of claim 2 further characterized in that said collector means is positioned to collect the descending spray of liquid coolant before it falls directly into the stored liquid whereby direct contact between the liquid coolant and the bulk of the stored liquid is avoided.

5. In a volatile liquid storage tank including a liquid containing portion and a chamber portion wherein vapors collect, a conservation arrangement comprising; chimney means defining vertically extending passage means in the chamber portion, said passage means being open to the chamber portion at an upper end and at a lower end of said passage means, a source of liquid coolant, and means for spraying said liquid coolant downwardly through said passage means to cool warm vapors in said passage means, wherein a draft is created through said passage means from said upper end to said lower end, said warm vapors being cooled and coalesced while passing through said passage means to reduce the pressure in said chamber portion, said cooled vapors being expelled over the surface of the stored liquid from said lower end of said passage means to inhibit further vaporization of the stored liquid.

6. The conservation arrangement of claim 5 further characterized by and including vane means positioned around said lower end of said passage means for directing cooled vapors radially of said chimney means to form a blanket of cooled vapors over the surface of the stored liquid.

7. In a volatile liquid storage tank including a liquid containing portion and a chamber portion wherein vapors collect, a conservation arrangement comprising; chimney means defining vertically extending passage means in the chamber portion, said chimney means including a vertically extending cylinder displaced from the surface of the stored liquid and open at both ends, a source of liquid coolant and means for spraying said liquid coolant downwardly through said passage means to cool warm vapors in said passage means, wherein a draft is created downwardly through said passage means, said warm vapors being cooled and coalesced while passing through said passage means to reduce the pressure in said chamber portion, said cooled vapors being expelled from said lower end and directed radially outwardly of the conservation arrangement over the surface of the stored liquid to form a blanket of cool vapors thereover and inhibit further vaporization of the stored liquid.

8. The conservation arrangement of claim 7 further characterized in that said cylinder is fabricated of metallic material having substantially good heat transfer characteristics whereby a portion of the heat carried by the warm vapors is dissipated indirectly through said cylinder to the spray of liquid coolant which contacts it.

9. In a volatile liquid storage tank including a liquid containing portion and a chamber portion wherein vapors collect, a conservation arrangement comprising; a chimney unit defining passage means in the chamber portion, said passage means including a passage extending from a generally centrally disposed inlet means in a path downwardly, outwardly, upwardly, outwardly, and downwardly, to outlet means disposed peripherally of said chimney unit, and means for spraying a liquid coolant downwardly through said passage means to cool warm vapors in said passage and create a draft therethrough from said inlet means to said outlet means, said warm vapors being cooled and coalesced while passing through said passage to reduce the pressure in said chamber portion, said cooled vapors being directed radially outwardly of said chimney unit over the surface of the stored liquid to form a blanket of cool vapors thereover and inhibit further vaporization of the stored liquid.

10. In a volatile liquid storage tank including a liquid containing portion and a chamber portion wherein vapors collect, a conservation arrangement comprising; a chimney unit including a vertically disposed inner cylinder, a vertically disposed intermediate cylinder, and a vertically disposed outer cylinder, said cylinders defining passage means from a centrally disposed inlet means downwardly through said inner cylinder, upwardly between said inner and intermediate cylinders, and downwardly between said intermediate and outer cylinders to peripherally disposed outlet means, means for spraying a liquid coolant downwardly through said inner cylinder wherein warm vapors in said inner cylinder are cooled and coalesced so as to reduce the pressure in the chamber portion, and a draft is induced through said passage means from said inlet means to said outlet means wherein vapors are drawn therethrough, and means for spraying a liquid coolant downwardly between said inner and intermediate cylinder means in countercurrent contact with the flow of the vapors through said passage means to further cool the vapors and reduce pressure in the chamber portion.

11. The conservation arrangement of claim 10 further characterized by and including liquid coolant trap means extending through said inner cylinder, a portion of the liquid coolant sprayed between said inner and intermediate cylinders being collected in said trap means and spilled over into said inner cylinder.

12. The conservation arrangement of claim 10 further characterized by and including collector means for collecting said liquid coolant, and means for recirculating said liquid coolant to said spray means for respraying downwardly through said passage means, said liquid coolant being passed through the stored volatile liquid in being recirculated whereby heat acquired by the liquid coolant from the warm vapors is dissipated to the stored liquid.

13. The conservation arrangement of claim 10 further characterized in that said liquid coolant comprises mercury.

14. The conservation arrangement of claim 12 further characterized in that said collector means is positioned to collect the descending spray of liquid coolant before it falls directly into the stored liquid whereby direct contact between the liquid coolant and the bulk of the stored liquid is avoided.

15. The conservation arrangement of claim 14 further characterized by and including trap means for trapping droplets of coolant liquid which have been carried over to said outlet means, and returning said trapped liquid to said collector means.

16. The conservation arrangement of claim 10 further characterized by and including means for directing the cooled vapors outwardly of said outlet means to form a blanket of cool vapors over the surface of the volatile liquid and inhibit further vaporization thereof.

17. A method of maintaining the pressure in the vaporous area of a volatile liquid storage tank below a preselected pressure comprising the steps of; providing vertically disposed passage means in said vaporous area, and spraying a liquid coolant downwardly through said passage means to cool and coalesce vapor within said passage means and create a downward draft therein whereby more warm vapors are drawn downwardly therethrough, the cooling and coalescing of said vapors effecting a lowering of the pressure in said vaporous area, and directing said cooled vapors radially outwardly of said passage means over the surface of the stored liquid to form a blanket of cool vapors thereover and inhibit further vaporization of the stored liquid.

18. A method of maintaining the pressure in the vaporous area of a volatile liquid storage tank below a preselected pressure comprising the steps of; providing vertically disposed passage means in said vaporous area and introducing a spray of liquid mercury downwardly through said passage means to cool and coalesce vapor within said passage means and create a downward draft therein whereby more warm vapors are drawn downwardly therethrough, the cooling and coalescing of said vapors effecting a lowering of the pressure in said vaporous area.

19. A method of maintaining the pressure in the vaporous area of a volatile liquid storage tank below a preselected pressure comprising the steps of; providing vertically disposed passage means in said vaporous area, spraying a liquid coolant downwardly through said passage means to cool and coalesce vapor within said passage means and to create a downward draft therein whereby more warm vapors are drawn downwardly therethrough and cooled therein, the cooling and coalescing of said vapors effecting a lowering of the pressure in said vaporous area, and directing the cooled vapors outwardly over the surface of the stored volatile liquid to create a blanket of cooled vapors over the surface and inhibit further vaporization of the stored liquid.

20. In a volatile liquid storage tank including a liquid containing portion and a chamber portion wherein vapors collect, a conservation arrangement comprising: a vertically disposed cylinder in the chamber portion floating on the stored liquid and having open upper and open lower end displaced from the surface of the stored liquid, a source of liquid coolant, and means for spraying said liquid coolant downwardly through said cylinder to cool warm vapors in said cylinder, wherein a draft is created through said cylinder from said open upper end to said open lower end, said warm vapors being cooled and coalesced while passing through said cylinder to reduce the pressure in said chamber, and radially disposed guide vanes mounted around said open lower end of said cylinder for directing cooled vapors expelled from said lower end over the surface of the stored liquid to inhibit further vaporization of the stored liquid.

21. The conservation arrangement of claim 20 further characterized in that said liquid coolant has a higher specific gravity than the stored liquid and is not miscible therewith.

References Cited by the Examiner

UNITED STATES PATENTS

| | | | |
|---|---|---|---|
| 636,256 | 11/99 | Gates | 55—257 |
| 1,545,352 | 7/25 | Rodriquez | 62—54 |
| 2,155,399 | 4/39 | Bruce | 62—121 X |
| 2,611,511 | 9/52 | Wissmiller | 62—54 |
| 2,790,307 | 4/57 | Ayres | 62—54 |
| 2,944,405 | 7/60 | Basore et al. | 62—54 |
| 2,986,893 | 6/61 | Skaredoff et al. | 62—54 |
| 3,108,447 | 10/63 | Maher et al. | 62—54 |

FOREIGN PATENTS

| | | |
|---|---|---|
| 57,354 | 10/52 | France. |
| 821,003 | 9/59 | Great Britain. |

ROBERT A. O'LEARY, *Primary Examiner.*

UNITED STATES PATENT OFFICE
CERTIFICATE OF CORRECTION

Patent No. 3,191,394

June 29, 1965

Hazelton H. Avery et al.

It is hereby certified that error appears in the above numbered patent requiring correction and that the said Letters Patent should read as corrected below.

Column 1, line 16, for "2,944,045" read -- 2,944,405 --.

Signed and sealed this 15th day of February 1966.

(SEAL)
Attest:

ERNEST W. SWIDER
Attesting Officer

EDWARD J. BRENNER
Commissioner of Patents